Aug. 21, 1923.

R. F. TRIMBLE 1,465,381

ELECTRODE AND ITS CONSTRUCTION

Filed Nov. 4, 1918

Inventor:
Russell F. Trimble.
by
Att'y.

Patented Aug. 21, 1923.

1,465,381

UNITED STATES PATENT OFFICE.

RUSSELL F. TRIMBLE, OF ELIZABETH, NEW JERSEY, ASSIGNOR TO WESTERN ELECTRIC COMPANY, INCORPORATED, OF NEW YORK, N. Y., A CORPORATION OF NEW YORK.

ELECTRODE AND ITS CONSTRUCTION.

Application filed November 4, 1918. Serial No. 261,030.

*To all whom it may concern:*

Be it known that I, RUSSELL F. TRIMBLE, a citizen of the United States, residing at Elizabeth, in the county of Union, State of New Jersey, have invented certain new and useful Improvements in Electrodes and Their Construction, of which the following is a full, clear, concise, and exact description.

The invention relates to electrode structures which may be employed in an electrical discharge device such as a thermionic device of the audion type.

One type of audion employs a filamentary cathode, a grid at each side of the cathode and a plate or anode surface adjacent each grid. The two grid electrodes, and the same is true of the two plate electrodes, are electrically connected together inside or outside of the evacuated container. A stronger and more compact arrangement of the double electrodes is provided according to the present invention, wherein the double electrode is provided in the form of a unitary structure. This has been applied to the manufacture of the grid or screen electrode which specifically is composed of two parallel U shaped side wires, parallel cross wires extending from one U to the other and at right angles thereto.

The feature of manufacturing the electrode is described and claimed in the divisional application, Serial No. 374,418, filed April 16, 1920. This is done by providing an extended electrode surface which is bent upon itself in such a fashion as to provide the desired number of electrode surfaces.

A jig, which is described and claimed in the divisional application Serial No. 374,419, filed April 16, 1920, is made use of in the manufacture of the grid electrode. This jig may be employed for making not only single grid electrodes, but it is particularly useful in the manufacture of a plurality of double grids, all of which may be made practically at the same time and in one continuous mechanical operation. On each of a plurality of flat jig faces are laid parallel wires which are to form the sides of the grid. The cross wires are formed by winding a wire across the side wires, the intersections being welded or otherwise fastened. The resulting composite structure is divided to form the required plurality of electrode surfaces.

Referring to the drawings for further details of the invention, Fig. 1 discloses in perspective a jig that may be employed in the manufacture of the electrode.

Figure 1:
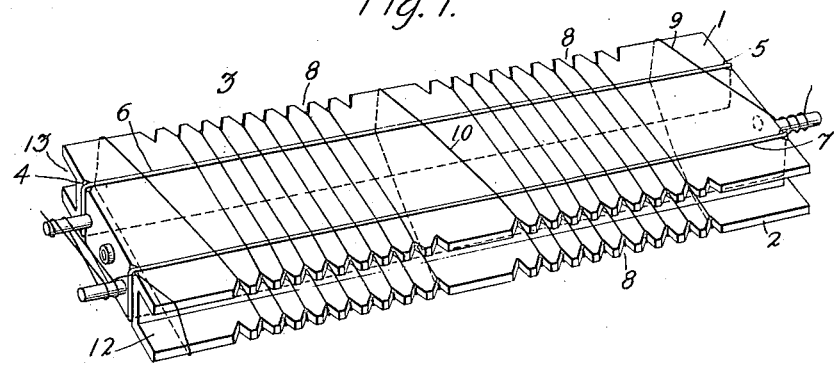

The top face 1 and the bottom face 2 of the jig 3, illustrated in Fig. 1, are constructed the same, the top face being provided with notches 4 and 5 that receive the longitudinal extending wire 6 which is to form one of the side wires in the grid. This wire 6 is continued across the face 2 as illustrated in dotted lines. A similar side wire 7 is also provided and is continued across both faces of the jig. The wires 6 and 7 may be held in the position shown by having their ends twisted or in any other suitable manner. Each edge of each face of the jig is provided with grooves 8 which are adapted to receive the wire 9 which is wound around the jig and across both faces thereof to provide the cross-wires of the grid. The winding process may be performed by hand or preferably the jig is supported in a lathe in order that it may be rotated while the wire 9 is wound thereupon. It will be noted that the wire 9 in passing from the front grooved edge of the lower face to the front grooved edge of the upper face is offset a similar offset being unnecessary at the other edge. This makes it possible for the wire 9 to cross always at right angles to the side wires 6.

Figure 2:
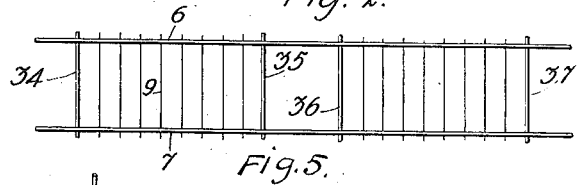
Figs. 2, 3 and 4 illustrate a grid electrode in various stages of its manufacture.
Figure 3:
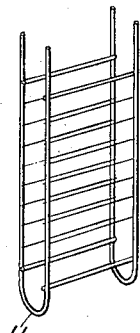
Figure 4:
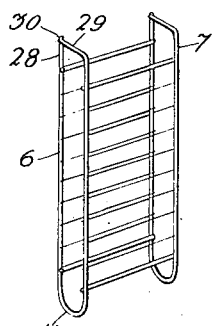

After the wire 9 has been wound upon the side wires as shown, the wires where they intersect are suitably fastened together, for instance, by welding. That portion of the wire represented by 10 at the middle of the jig is not welded to the cross wires, the vacant portion at the middle of the jig being provided in order that room may be had for forming the arch 11 which integrally connects the two grid surfaces as shown in Figs. 3 and 4. The reinforcing wires shown at 34, 35, 36 and 37 Fig. 2 may be cut to approximately the proper length, laid across the side wires 6 and 7 Fig. 1 and welded thereto, while the wires 6, 7, 34, 35, 36 and 37 are shown heavier than the cross wire 9, these may all be of the same size or the cross wires 9 may be larger than the other wires. After the intersections of the cross and side wires have been welded a suitable cutting tool, such as a pair of scissors, may be passed along a groove 12 and a similar groove 13 at the other edge of the jig in order to cut the wire 9 along these grooves. The side wires 6 and 7 are also cut at the ends of the jig. This releases two double grid surfaces somewhat of the form shown in Fig. 2. After trimming the ends of the cross wires 9, which project beyond the side wires 6 and 7, the resulting electrode may be suitably bent into the shape shown in Fig. 3.

To further strengthen the grid structure the projecting end 28 of the side wire 6 may be welded to the adjacent projecting end 29 as shown at 30 in Fig. 4. The other two projecting ends of the side wire 7 may be similarly welded.

It will be apparent that the grid electrode shown in Fig. 4 is a rigid compact structure, the side wires of which are U shaped, the cross wires extending from the leg of one U to the corresponding leg of the other U.

Figure 5:
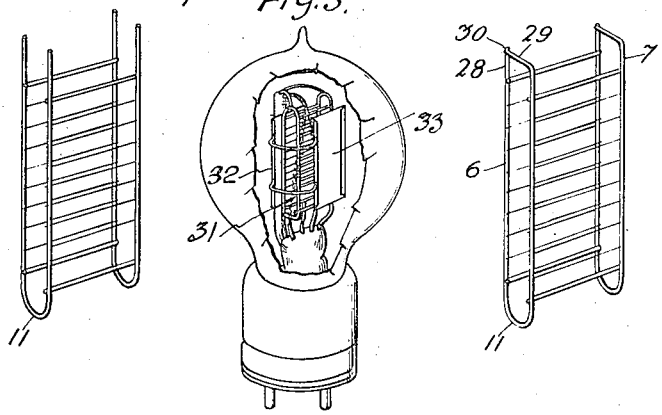
Fig. 5 illustrates a vacuum tube device in which the electrode shown in Fig. 4 may be employed.

The electrode shown in Fig. 4 is particularly adapted to be employed as a double grid electrode in a device of the audion type as shown in Fig. 5 wherein the grid electrode has one surface located between the cathode 31 and the anode or plate 32 and the other grid surface extending between the cathode 31 and the other plate or anode 33.

What is claimed is:

1. In an electron discharge device, a grid electrode comprising a pair of supporting members, each formed from a single length of wire bent to provide an arched portion and a pair of straight portions, frame wires extending between and welded to each pair of corresponding straight portions at points removed from the ends of said straight portions, and grid wires extending between and supported by said corresponding straight portions.

2. In an electron discharge device, a grid comprising a pair of supporting members, each formed from a single length of wire bent to provide an arched portion and a pair of straight portions of unequal length, the end of each longer portion being bent at right angles and welded to the end of the shorter portion, and cross wires extending between and welded to the corresponding straight portions of said supporting members.

3. In an electron discharge device, a grid electrode comprising a pair of supporting members, each formed from a single length of wire bent to provide an arched portion, and a pair of straight portions of unequal length, the end of each longer portion being bent at right angles and welded to the shorter portion, frame wires extending between and welded to the corresponding straight portions at points removed from the ends thereof, and grid wires extending between and supported by said corresponding straight portions.

In witness whereof, I hereunto subscribe my name this 26th day of October A. D., 1918.

RUSSELL F. TRIMBLE.